Nov. 21, 1933.  J. A. OBERMAIER  1,936,140
PYROMETER
Filed July 6, 1926  2 Sheets-Sheet 1
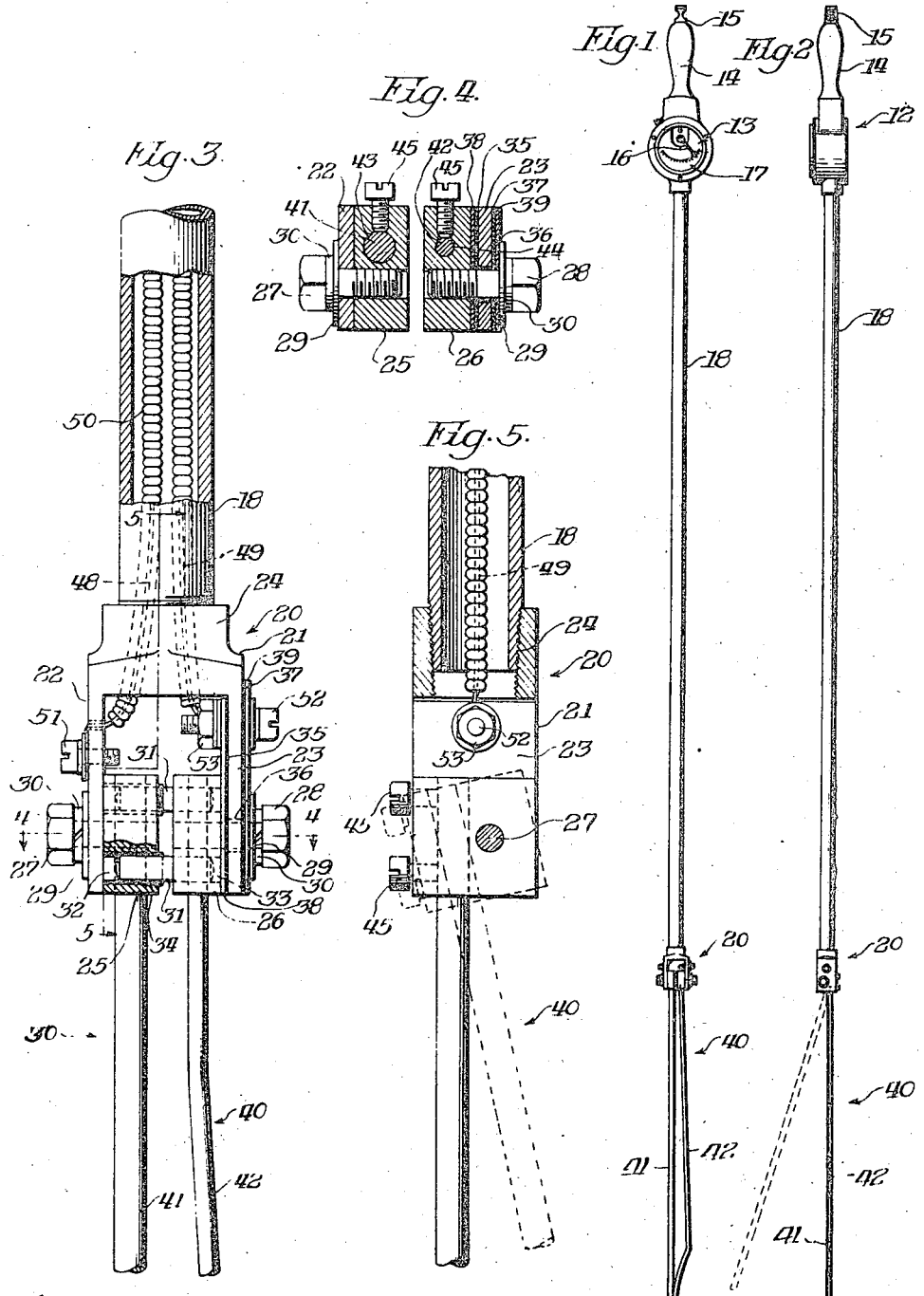
Inventor
John A. Obermaier
By Brown, Boettcher - Dienner
Attys.

Nov. 21, 1933.    J. A. OBERMAIER    1,936,140
PYROMETER
Filed July 6, 1926    2 Sheets-Sheet 2
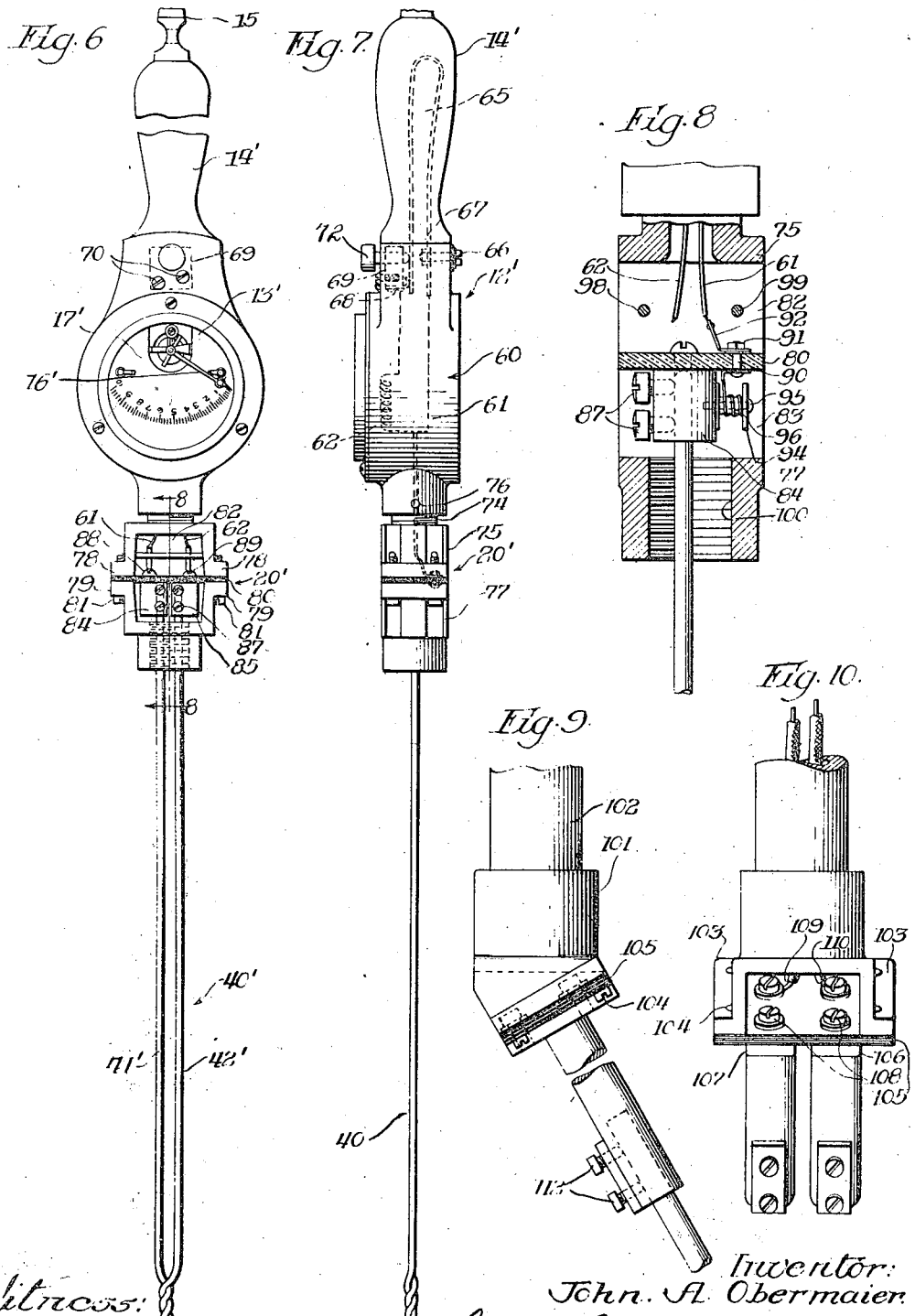

Patented Nov. 21, 1933

1,936,140

UNITED STATES PATENT OFFICE 1,936,140

PYROMETER

John A. Obermaier, Chicago, Ill.

Application July 6, 1926. Serial No. 120,596

16 Claims. (Cl. 73—32)

My invention in general relates to electrical indicators and more particularly to portable pyrometers.

In the production of commercially perfect castings, authorities have repeatedly gone on record in saying that the pouring temperatures should be as low as practical. Obviously, if the temperature is too low it is impossible to use the molten metal since it will not have sufficient fluidity to reach the farthest point in the mold without undue chilling. On the other hand, if the temperature of the molten metal is excessive, the results are a deteriorated or lifeless metal, defective castings, loss of metal due to excessive oxidation, and a waste of fuel.

Now the estimating of the temperature of molten metal is a very difficult process and is, as a rule, entirely inaccurate. For this reason foundries have resorted to pyrometers for the purpose of detecting whether the temperature of the metal is too hot or too cold. These instruments do away with the necessity of guessing or estimating the pouring temperatures.

In practice the usual portable pyrometer includes flexible connections or leads between the thermo-couple and the meter, which is usually of the galvanometer type. This type of pyrometer has not proven satisfactory for several reasons. In the first place, the instrument is quite frequently shattered and severely damaged due to a person accidentally stumbling over the lead wires and dislodging the instrument from its resting place. Secondly, such a device usually requires the attention of two men in order to obtain a temperature reading of the molten metal. Lastly, the lead wires wear out frequently and the result is that the poorly insulated lead wires give trouble.

I propose to provide a portable pyrometer particularly useful where only occasional temperature checks are required of the metal under treatment and comprising a single mechanical unit of all the elements such as the thermo-couple, lead wires, and milli-voltmeter. This arrangement does away with the sources of trouble due to loose connections between the lead wires, thermo-couple, and instrument, as are experienced in the many pyrometers now being used. In other words, all of the required elements of my portable pyrometer are assembled into a single convenient portable unit. Thus it will be seen that I have provided a sturdy instrument which will survive the hardships encountered in the foundries.

A feature of my portable pyrometer pertains to the mounting of the thermo-couple which permits of the thermo-couple being adjusted to any angle found most convenient for local conditions. This enables the device to be used to measure the temperatures of metal while it is still in the furnace, thus avoiding the possibility of overheating the metal and thereby affecting its quality.

A feature of my invention pertains to the provision of a novel joint between the thermo-couple and the indicating meter, which is comparatively cheap to manufacture and which may also be quickly assembled. This joint of my invention serves to at all times protect the meter from the heat to which the thermo-couple is subjected when in use. Also, the thermo-couple may be easily connected to the joint or disconnected therefrom without in any way disturbing the leads to the meter.

Another feature of my invention has to do with the provision of ventilating means between the meter and the thermo-couple. I preferably locate this ventilating means at the joint and associate it with a heat insulator.

In accordance with the features of the preferred embodiment of my invention, I provide an extension member and an elbow joint at the end thereof for the thermo-couple. The other end of the extension member is connected to the casing in which the meter is housed. This elbow joint, in reality, constitutes a pivotal mounting for one end of the thermo-couple and permits the thermo-couple to be adjusted to any angle which the local conditions may require.

In accordance with other features of my invention, I provide another form of pyrometer which is of substantially the same general unitary construction as the preferred form of my invention, and is particularly adapted for use in connection with detecting of temperature in furnaces rather than the temperature of molten metal.

Other objects and advantages of my invention will more fully appear from the following detail description taken in connection with the accompanying drawings, which illustrate several embodiments thereof, and in which:—

Figure 1 is a front elevational view of the preferred form of my novel portable pyrometer;

Figure 2 is a side elevational view of the pyrometer shown in Figure 1;

Figure 3 is an enlarged view, partly in section, of the joint used between the thermo-couple and the meter in the preferred form of my invention;

Figure 4 is a cross sectional view taken on the line 4—4 of Figure 3;

Figure 5 is a side sectional view taken on substantially the line 5—5 of Figure 3, looking in the direction indicated by the arrows;

Figure 6 is a front elevational view of another form of my pyrometer;

Figure 7 is a side elevational view of this second form of my invention;

Figure 8 is a vertical sectional view taken on substantially the line 8—8 of Figure 6 looking in the direction indicated by the arrows and illustrating the connecting joint between the thermo-couple and the meter;

Figure 9 is a side elevational view of another type of joint which may be substituted for that shown in Figure 8; and Figure 10 is a rear elevational view of the joint shown in Figure 9.

Referring now to the drawings in detail in which like reference numerals designate similar parts throughout the several views, 12 denotes generally a metallic casing which is preferably made of a light metal such as aluminum. This casing 12 serves as a housing for a meter 13, which may be of any conventional galvanometer or milli-voltmeter construction. The casing 12 is provided with an integral handle 14 and a hook 15 for enabling the pyrometer of my invention to be hung up when not in use. The meter 13 includes a pointer 16 and a scale 17 graduated in terms of temperature, preferably in degrees of Fahrenheit.

Threaded into the lower end of the casing 12 is an extension tube or pipe 18, the purpose of which is to facilitate usage of the pyrometer in those places where it is difficult to have access to the substance of which a temperature reading is desired. Associated with the lower end of the tube 18 is an elbow like joint, designated generally by the reference character 20. As best shown in Figure 3, the joint 20 comprises a forked member 21 threaded onto the lower end of the tube 18. This forked member 21 comprises a pair of spaced parallel legs 22 and 23 and a tubular portion 24. The tubular portion 24 communicates with the bore of the tube 18 and the space separating the two parallel legs 22 and 23.

Positioned between the legs 22 and 23 are a pair of intermediate blocks 25 and 26. The block 25 is pivotally connected to the leg 22 by means of a screw 27, and the block 26 is pivotally connected to the leg 23 by means of a screw 28. Positioned between the head of each screw and the associated leg of the member 21 are a pair of washers 29 and 30. The washers 30 are preferably of the split washer construction. It will be evident from the illustration in Figure 4 that the blocks 25 and 26 are adapted to be pivoted about the threaded shank of the two screws 27 and 28.

In order to cause the two blocks 25 and 26 to be pivoted together, I preferably connect them by means of a pair of pins 31. Since each of the pins 31 and its associated mounting is identical to the other pin and mounting, it is believed that a description of one will suffice for both. The pin 31 extends into an aperture 32 in the block 25 and into an aperture 33 in the block 26. The pin 31 is insulated from the block 25 by means of a mica bushing 34.

The block 26 is insulated from the leg 23 of the member 21 by means of a mica insulator 35. Also, the screw 29 is insulated from the leg 23 by means of a mica bushing 36 and a mica insulator 37. It should be noted that associated with each of the insulators 35 and 37 is a metallic plate. I have designated these plates generally by the reference characters 38 and 39. It is obvious from Figure 4 that the plate 39 is insulated from the leg 23 by means of the insulator 37, and the plate 38 is insulated from the leg 23 by means of the mica insulator 35. Thus the block 26 is completely insulated from the member 21.

Associated with the joint 20 is a thermo-couple, designated generally by the reference character 40. This thermo-couple 40 comprises a pair of rods 41 and 42 made of dissimilar metals. The rod 41 has its upper end fitted in an aperture 43 in the block 25 (Figure 4). The rod 42 has its upper end fitted in an aperture 44 in the block 26. These two rods 41 and 42 are securely fastened to the blocks 25 and 26, respectively, by means of set screws 45. From the foregoing it will be evident that the rod 41 of the thermo-couple is electrically connected to the member 21, whereas the rod 42 is electrically connected to the block 26 and is insulated from the member 21.

Extending through the tube 18 are a pair of lead wires 48 and 49 which are connected to the meter 13. These wires 48 and 49 are preferably insulated from the tube 18, as well as from each other, by means of beads 50. Also, the lead wires 48 and 49 are preferably made of the same metallic material as the members 41 and 42, respectively, of the thermo-couple 40.

The lower end of the wire 48 is rigidly fastened to a screw 51 secured to and electrically connected to the leg 22 of the member 21. In other words, this lead wire 48 is electrically connected to the member 41 of the thermo-couple. The lower end of the lead wire 49 is connected to a bolt 52 which is held in place by means of a nut 53. The bolt 52 is insulated from the leg 23 of the member 21 by means of the previously described insulators 35 and 37 and, at the point of passage of the bolt through the leg, by any known means, such as a bushing or like, maintaining the bolt out of electrical contact with the leg. It will be apparent that this bolt 52 is electrically connected to the member 42 of the thermo-couple through the means of the plates 38 and 39 and the block 26.

As is shown in Figure 3, the screw 51 is adapted to serve as a stop to limit the movement of the blocks 25 and 26 about their pivots in one direction. The split or spring washers 30 serve to apply tension to the blocks 25 and 26 to resist their movement about their pivots. The thermo-couple 40, through these blocks 25 and 26, is adapted to be moved to various angular positions with respect to the axis of the tube 18. In other words, the thermo-couple may be adjusted to any angle found most convenient for local conditions. Also, inasmuch as the pyrometer above described is of a unitary construction, it may be operated with facility by a single man to obtain a temperature reading of molten metal, or the like. Then, too, worn or poorly insulated lead wires cannot give trouble in the pyrometer of my construction inasmuch as they are completely enclosed in a rigid tube 18, which connects the meter casing to the thermo-couple. This arrangement eliminates any possibility of accidentally stumbling over the lead wires, and thus dislodging the instrument from its resting place, and causing expensive damage.

The thermo-couple members or wires 41 and 42 may be ordinarily joined at the fire end by welding. This, however, is not absolutely essential, since the wires may be opened at the fire end and the circuit completed through the molten metal. Obviously, the electricity generated in the thermo-couple by the heating process, when it is subjected to molten metal, travels through the instrument or meter causing the pointer to move to a value on the scale corresponding to the temperature of the thermo-couple.

The joint 20, in addition to serving as a pivotal mounting for the thermo-couple 40, also serves as a means for ventilating my unitary device. That is to say, by making the member 21 of a bifurcated construction, a space or opening is provided through which air is free to circulate for the purpose of cooling the member 21 and for preventing conduction of heat from the thermo-couple 40 to the tube 18 and the casing 12. If it is desired, the tube 18 may be suitably insulated from the member 21 by any conventional heat insulator. I shall describe the use of a heat insulator for the purpose of insulating the meter casing from the thermo-couple hereinafter in connection with another embodiment of my invention.

The embodiment of my invention above described is particularly adapted for use in measuring the temperature of molten metal. I shall now describe in detail an embodiment of my invention which is also of a unitary construction and which is particularly useful in connection with the measuring of the temperature of a gas or an atmosphere, such as that which exists in a furnace. The thermo-couple in this construction is not subjected to such extreme usage as is the thermo-couple in the embodiment of the invention just described. This modification of my invention is illustrated in Figures 6, 7, and 8.

Referring now to Figures 6, 7 and 8, I have designated generally the meter casing by the reference character 12'. Positioned in this casing is a meter 13' which may be of the galvanometer milli-voltmeter type. This meter 13' includes a scale 17' graduated in terms of temperature, and a pointer 16'. The casing 12' is preferably made of a light metallic material and has formed integral therewith a handle portion 14' equipped with a hook 15' by means of which the pyrometer may be hung up in position out of the way when it is not in use.

Associated with the meter 13' is an electrical circuit 60 comprising a pair of leads 61 and 62. This circuit is drawn somewhat diagrammatically in dotted lines in Figure 7.

Associated with the circuit 60 is a U-shaped resilient member 65 which extends into the hollow of the handle 14'. One end of this U-shaped spring member 65 is fastened to a bolt 66 extending through the casing 12' and is held in place by means of a nut 67. Of course, it is to be understood that the bolt 66 is suitably insulated from the casing 12'. The other end of U-shaped member 65 is at all times urged into engagement with a contact element 68 fastened to an insulator block 69. The block 69 is in turn secured to the casing by means of small screws 70. One end of the lead wire 61 is connected to the screw 66, and one end of the lead 62 is connected to the contact element 68. Normally, the U-shaped element 65 will have its leg in engagement with the contact element 68, thus completing the electrical circuit. A button 72 is associated with the casing 12' and has a shank extending through a suitable aperture in the block 69. The button 72 and its shank are preferably made of some insulating material so as not to ground the U-shaped element thru the casing.

Now, obviously, upon pressing the button 72, the circuit may be broken by moving the U-shaped arm out of engagement with the contact element 68. Upon removing the finger from the button out to its furthermost position, the circuit closes again. The shank 73 of the button may be provided with any suitable means such as a pin or an enlarged portion for preventing its removal from the block 69.

It is to be understood that a similar switch may be embodied in the modification shown in Figures 1 and 2. A switch of this type is disposed in the handle 14 and casing 12 of this embodiment. This switch operates in the same manner as the switch disclosed in Figures 6 and 7, and it is believed that no further description is necessary.

The casing 12' has threaded therein a shank 74 of a support element 75 which comprises a part of the joint 20'. The element 75 is held in place in the casing 12' by means of a small set screw 76. The element 75 is of a U-shape and is adapted to co-operate with another U-shaped element 77 of substantially the same construction. The element 75 has laterally projecting flanges 78 and the element 77 has laterally projecting flanges 79, adapted to co-operate with the flanges 78. Disposed intermediate to the two elements 75 and 77 is a heat insulator 80 which serves to insulate the meter casing from the high temperatures imposed on the thermo-couple 40'. The two elements 75 and 77, as well as the intermediate insulator 80, are securely fastened together by means of bolts 81.

The ends of the leads 61 and 62 extend thru the shank 74 of the element 75 into an open space 82. The space 82 is closed partially by the U-shaped element 75. The U-shaped element 77 is also equipped with a hollow or open space 83. Positioned in the space 83 are a pair of spaced blocks 84 and 85 to which are fastened the members 41' and 42' of the thermo-couple 40'. The blocks 84 and 85 are substantially identical in construction and are preferably made of metal, such as brass. The elements or members 41' and 42' are secured in place in the blocks 84 and 85 by means of set screws 87. The blocks are secured to the insulator 80 by means of screws 88 and 89, respectively.

The lead 62 is fastened to the screw 89 and is electrically connected to the associated thermo-couple member 42' by means of the block 85. The lead 61 is connected to a bolt 90 secured to the heat insulator 80 by means of a nut 91. As best shown in Figure 8, the bolt 90 serves to fasten a terminal lug 92 to the top of the heat insulator 80. This terminal lug constitutes the connection between the bolt 90 and the end of the lead wire 61. Secured to the block 84 is a grooved element 94. This element 94 is preferably fastened to the block 84 by means of a screw 95. A conductor 96 is partly wound around the grooved element 94 and has one end secured thereto. The other end of this conductor 96 is fastened to the bolt 90 to connect the lead wire 61 to the block 84. The element 94 may be turned on the screw 95 by simply loosening the screw. In so doing the wire or conductor 96 may be wound or unwound on the element 94 as desired. The purpose of this conductor 96 is to permit proper calibration of the meter 13'. This is done by shortening or lengthening the wire 96 by winding it or unwinding it from the spool-like element 94. The wire 96 and the lead wire 61 should be preferably made of the same metallic material as the thermo-couple member 41'. Also the lead wire 62 should be made of the same metallic material as the thermo-couple member 42'.

To prevent the lead wires 61 and 62 from being accidentally broken, I provide the guard rods 98 and 99 which extend centrally across the width of the support element 75 in the space 82 and are held in place by being pressed into suitable apertures in the sides of the element 75.

The lower part of the element 77 is provided with a threaded portion 100 adapted to receive an end of an extension pipe or the like, should it be desired to connect such a pipe to the support for the purpose of housing the thermo-couple 40'. The operation of this form of my invention is believed to be obvious from what has gone before and it is, therefore, believed that no further description of the same will be necessary. By virtue of the free circulation of air through the open space 82 and in and around the elements 75 and 77 and the blocks 84 and 85 heat from the furnace or other heat zone will not be conducted along the pipe to the meter casing and thence to the meter itself but will be largely dissipated. Thus the instrument will be protected and will not become overheated nor will the readings be disturbed by any abnormal rise of temperature of the cold junctions.

In Figures 9 and 10 I have illustrated a modified form of joint between the thermo-couple and the casing. In this form of the invention an angular support member 101 is suitably secured to the lower part of the meter casing. A short length of tubing may be disposed intermediate the member 101 and the casing, if it is so desired. I have indicated such a tube by the reference character 102. This tube 102 is adapted to house the lead wires from the meter circuit. An insulating plate having heat insulating qualities is secured to the angular support 101 by means of suitable bolts 104. I have designated the heat insulator by the reference character 105. It should be noted that the bolts 104 extend through the heat insulator 105 and are threaded into the flanges 103 of the support 101.

Fastened to the bottom part of the plate 105 is a pair of holders 106 and 107. These holders are preferably secured to the heat insulator or plate 105 by means of screws 108 which extend through the plate and thread into suitable openings in the holders 107 and 106. These screws, to which the leads 109 and 110 are connected, serve as a means for electrically connecting these leads to the holders 107 and 106.

Each of the holders 106 and 107 is provided with suitable openings adapted to receive the elements of a thermo-couple, such as the elements 41' and 42' shown in Figure 6. Suitable set screws 112 serve to firmly hold the free ends of the thermo-couple elements or members in the openings provided therefor in the holders 106 and 107. By providing the angular joint or support member 101 it is possible to obtain temperature readings with facility in the case of melting pots, and the like.

Now I desire it understood that although I have described in detail several forms of my invention, the invention is not to be limited thereby, but only in so far as defined by the scope and spirit of the appended claims.

I claim:—

1. In combination, a galvanometer, a housing therefor, a thermo-couple electrically connected to said galvanometer, extension means for said thermo-couple secured to said housing, and means at the end of said extension means for pivotally supporting said thermo-couple.

2. In combination, a galvanometer, a housing therefor, a thermo-couple electrically connected to said galvanometer, extension means for said thermo-couple secured to said housing, and means at the end of said extension means for pivotally supporting said thermo-couple, said means comprising a support member secured to said extension means, and a pair of contact blocks for holding said thermo-couple pivotally mounted on said support member.

3. In combination a galvanometer, a metallic housing for said galvanometer, having a handle portion, a switch for the galvanometer provided with operating means accessible from the handle, an extension member secured to said housing, a support mounted on the free end of said extension member, a thermo-couple connected in series with said switch and said galvanometer, and means for pivotally mounting said thermo-couple on said support.

4. In a pyrometer, mounting means for a thermo-couple comprising a bifurcated support member having a pair of contact blocks pivotally mounted thereon, and an insulating element for securing said blocks together for simultaneous movement about their pivotal mounting.

5. In a portable pyrometer comprising a single mechanical unit consisting of a meter, a housing therefor, a pair of extension lead wires connected to said meter, an extension tube through which said wires pass connected at one end to the housing, a thermo-couple associated with the other end of the tube, and a pivotal mounting for the thermo-couple disposed between it and the end of the tube, said lead wires being connected to said thermo-couple through said mounting.

6. A portable pyrometer comprising a meter housing, a meter therein, a relatively long extension supported by the meter housing and a thermo-couple pivotally supported at the free end of the extension and electrically connected with the meter.

7. A portable pyrometer comprising a meter housing, a meter in said housing, a handle on the housing and a pyrometer supported by said housing and constituting with said housing, meter and handle, a portable unitary structure, said pyrometer having a hot end adjustable angularly to different positions.

8. A pyrometer comprising, in combination, a thermo-couple, a meter, an enclosing casing for the meter, an extension means mounted on said casing and having at its extended end a U-shaped bracket having extending leg portions, supporting means for the thermo-couple carried by said portions and adapted to have pivotal movement thereabout, means securing the thermo-couple to said supporting means, and means electrically connecting the thermo-couple to said meter.

9. A pyrometer comprising, in combination, a thermo-couple, a meter, an enclosing casing for the meter, a spacing means having a U-shaped portion, supporting means for the thermo-couple carried by said portion, means securing the thermo-couple to said supporting means, said supporting means being formed of insulating material and means electrically connecting the thermo-couple to said meter.

10. A pyrometer comprising, in combination, a thermo-couple, a meter, an enclosing casing for the meter, a spacing means having a U-shaped portion, an insulated block carried thereby, means securing the elements of the thermo-couple to said insulated block in separated relationship, and means electrically connecting the thermo-couple to said meter.

11. A pyrometer comprising a meter having a housing, a thermo-couple, connections between said meter and the thermo-couple, an enclosing tube for said connections, and means connecting the thermo-couple to the tube and adapted to dissipate heat to the surrounding atmosphere to prevent conduction of heat along the tube to the meter housing.

12. A pyrometer comprising a meter having a housing, a thermo-couple, connections between said meter and the thermo-couple, an enclosing tube for said connections, and means comprising spaced apart elements connected respectively with the thermo-couple and with the tube and adapted to dissipate heat to the surrounding atmosphere to prevent conduction of heat along the tube to the meter housing.

13. A pyrometer comprising a meter housing, a meter therein, a tube and means connecting the same to the housing, a thermo-couple, insulated means pivotally mounting the thermo-couple on said tube, and means connecting the thermo-couple with said meter.

14. A portable pyrometer comprising a meter housing, a meter in said housing, extension means connected with the housing, and a thermo-couple supported by said extension means, said thermo-couple having a hot end adjustable angularly to different positions relative to said extension means.

15. A portable pyrometer comprising a meter housing, a meter therein, a relatively long extension supported by the meter housing, a thermo-couple carried by said extension and electrically connected with the meter, said thermo-couple consisting of relatively short rods, and means pivotally supporting said rods whereby the latter are adjustable angularly to different positions relative to said extension.

16. A portable device for measuring the temperature of hot liquids by dipping it into the liquid, comprising an electrical indicating instrument including a case, a tube projecting from said case, a holder at the free end of said tube, a thermo-couple, means pivotally securing said thermo-couple to said holder, and leads within said tube connecting said thermo-couple to said instrument.

JOHN A. OBERMAIER.